US012633125B2

(12) United States Patent
Yamasaki et al.

(10) Patent No.: US 12,633,125 B2
(45) Date of Patent: May 19, 2026

(54) VEHICLE WITH ROAD SURFACE IMAGE RENDERING FUNCTIONALITY

(71) Applicant: SUBARU CORPORATION, Tokyo (JP)

(72) Inventors: Kentarou Yamasaki, Tokyo (JP); Makoto Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 189 days.

(21) Appl. No.: 18/431,681

(22) Filed: Feb. 2, 2024

(65) Prior Publication Data

US 2024/0273911 A1     Aug. 15, 2024

(30) Foreign Application Priority Data

Feb. 14, 2023     (JP) ................................. 2023-021182

(51) Int. Cl.
G06V 20/56        (2022.01)
G06V 10/74        (2022.01)
H04N 5/74         (2006.01)
(52) U.S. Cl.
CPC ............ *G06V 20/56* (2022.01); *G06V 10/761* (2022.01); *H04N 5/74* (2013.01)
(58) Field of Classification Search
CPC ........ G06V 20/56; G06V 10/761; H04N 5/74; B60Q 1/50; B60Q 2400/50; E01F 9/608; E01F 9/615
See application file for complete search history.

(56) References Cited

U.S. PATENT DOCUMENTS 10,134,283 B2    11/2018  Masuda et al.
2019/0202341 A1*  7/2019  Rikimaru ................. B60Q 1/50

FOREIGN PATENT DOCUMENTS

JP        2010-211404  A     9/2010
JP        2015-164828  A     9/2015
JP        2016-055691  A     4/2016
JP        2020-111284  A     7/2020

* cited by examiner

*Primary Examiner* — James M Pontius
(74) *Attorney, Agent, or Firm* — Rimon P.C.

(57)        ABSTRACT

A vehicle with road surface image rendering functionality includes a light projection member, a controller, and a detection device. The light projection member is configured to perform light projection for road surface image rendering toward a road surface in front of the vehicle and render a road surface image on the road surface. The controller is configured to control the light projection for the road surface image rendering by the light projection member. The detection device is configured to detect a vehicle-to-vehicle distance to a preceding vehicle in front of the vehicle. The controller is configured to, in accordance with the vehicle-to-vehicle distance detected by the detection device, change a position of the road surface image rendered on the road surface by the light projection member and so that the position of the road surface image is closer to the vehicle than a rear end of the preceding vehicle.

12 Claims, 11 Drawing Sheets

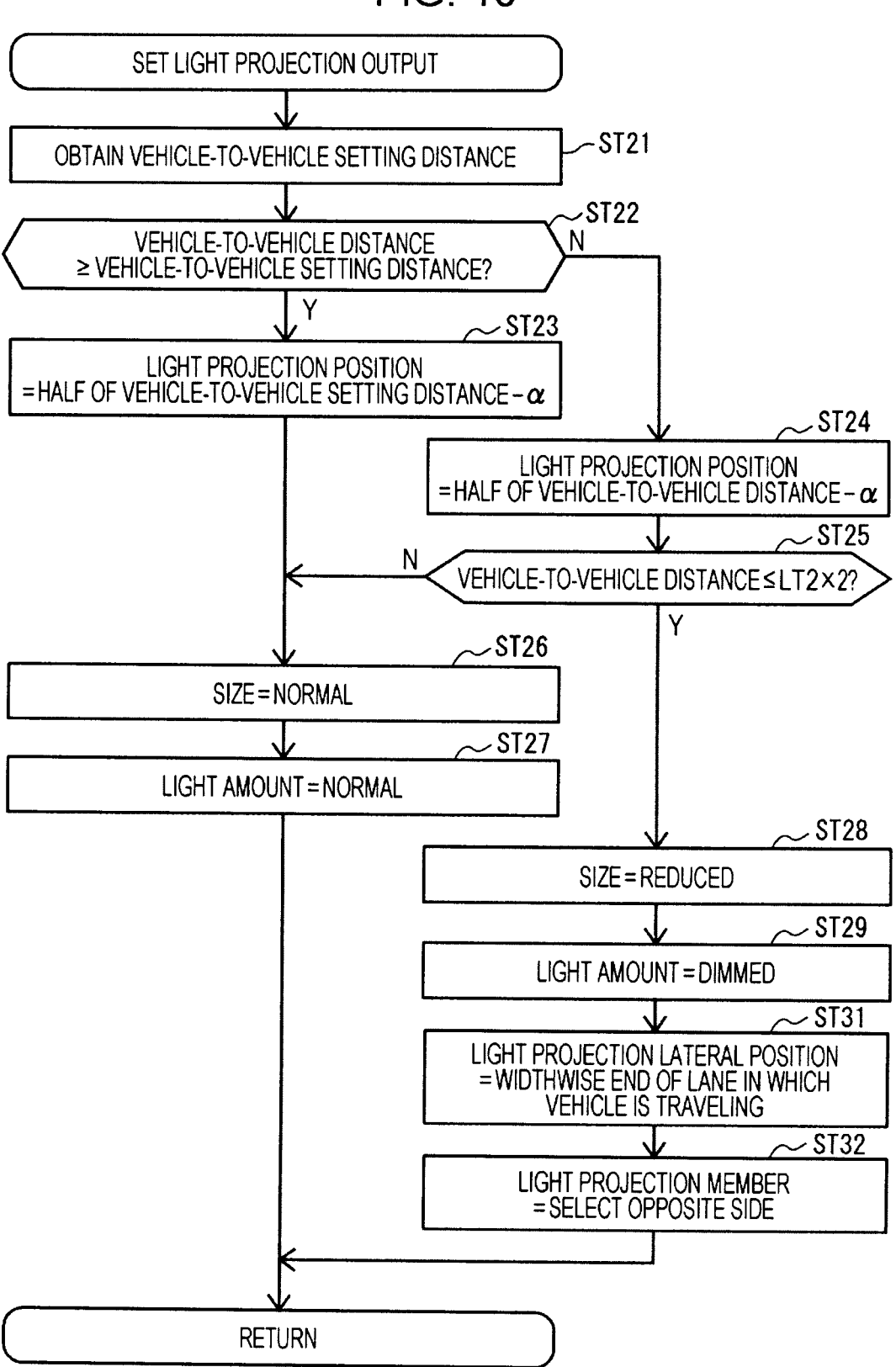

SET LIGHT PROJECTION OUTPUT

OBTAIN VEHICLE-TO-VEHICLE SETTING DISTANCE ST21

VEHICLE-TO-VEHICLE DISTANCE ≥ VEHICLE-TO-VEHICLE SETTING DISTANCE? ST22

N

Y

LIGHT PROJECTION POSITION = HALF OF VEHICLE-TO-VEHICLE SETTING DISTANCE − α ST23

LIGHT PROJECTION POSITION = HALF OF VEHICLE-TO-VEHICLE DISTANCE − α ST24

VEHICLE-TO-VEHICLE DISTANCE ≤ LT2×2? ST25

N

Y

SIZE = NORMAL ST26

LIGHT AMOUNT = NORMAL ST27

SIZE = REDUCED ST28

LIGHT AMOUNT = DIMMED ST29

LIGHT PROJECTION LATERAL POSITION = WIDTHWISE END OF LANE IN WHICH VEHICLE IS TRAVELING ST31

LIGHT PROJECTION MEMBER = SELECT OPPOSITE SIDE ST32

RETURN

VEHICLE WITH ROAD SURFACE IMAGE RENDERING FUNCTIONALITY

CROSS-REFERENCE TO RELATED APPLICATIONS

The present application claims priority from Japanese Patent Application No. 2023-021182 filed on Feb. 14, 2023, the entire contents of which are hereby incorporated by reference.

BACKGROUND

The disclosure relates to a vehicle with road surface image rendering functionality.

Japanese Unexamined Patent Application Publication (JP-A) Nos. 2016-055691, 2020-111284, 2015-164828, and 2010-211404 disclose that, by projecting light from a vehicle, various patterns are rendered on a road surface on which the vehicle is traveling.

By rendering such patterns on the road surface, the vehicle can provide information related to its traveling, etc. to the driver who is driving the vehicle and to others through the road surface.

SUMMARY

An aspect of the disclosure provides a vehicle with road surface image rendering functionality. The vehicle includes a light projection member, a controller, and a detection device. The light projection member is configured to perform light projection for road surface image rendering toward a road surface in front of the vehicle and render a road surface image on the road surface. The controller is configured to control the light projection for the road surface image rendering by the light projection member. The detection device is configured to detect a vehicle-to-vehicle distance to a preceding vehicle in front of the vehicle. The controller is configured to, in accordance with the vehicle-to-vehicle distance detected by the detection device, change a position of the road surface image rendered on the road surface by the light projection member and so that the position of the road surface image on the road surface is closer to the vehicle than a rear end of the preceding vehicle.

An aspect of the disclosure provides a vehicle with road surface image rendering functionality. The vehicle includes a light projection member, circuitry, and a detection device. The light projection member includes a light source and is configured to perform light projection for road surface image rendering toward a road surface in front of the vehicle and render a road surface image on the road surface. The circuitry is the configured to control light projection for the road surface image rendering by the light projection member. The detection device includes a sensor and is configured to detect a vehicle-to-vehicle distance to a preceding vehicle in front of the vehicle. The circuitry is configured to, in accordance with the vehicle-to-vehicle distance detected by the detection device, change a position of the road surface image rendered on the road surface by the light projection member so that the position of the road surface image on the road surface is closer to the vehicle than a rear end of the preceding vehicle.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 3 is a schematic descriptive diagram of the structure and layout of a right headlamp module and a left headlamp module in the front end of the vehicle illustrated in FIG. 1;

FIG. 10 is a flowchart of detailed control for setting light projection output in a second embodiment, executed in step ST9 of FIG. 5 by the rendering control device illustrated in FIG. 2;

DETAILED DESCRIPTION

A road surface image rendered on the road surface by light projection from the vehicle is not necessarily desirable.

There may be a preceding vehicle on the road on which the vehicle is traveling. In this case, a reflection of the road surface image may impair the rearward visibility of the preceding vehicle.

As described above, there is a demand for improved road surface image rendering from the vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
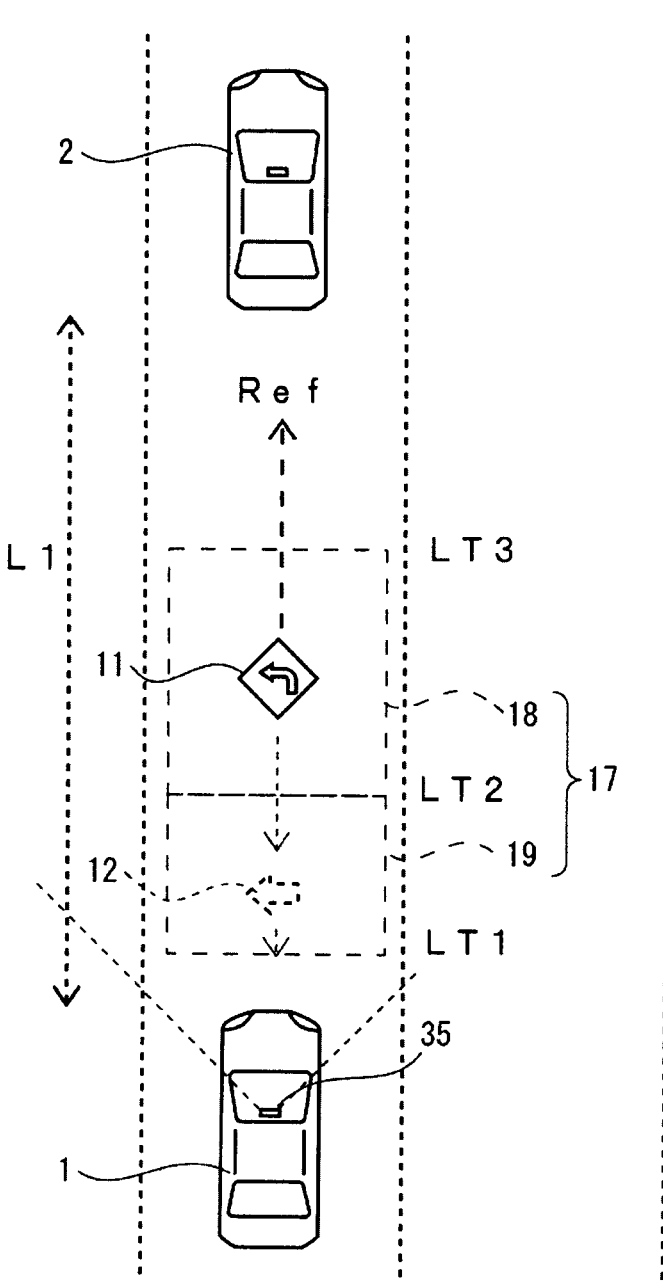
FIG. 1 is a descriptive diagram of an example of a traveling state of a vehicle according to a first embodiment of the disclosure.

FIG. 1 is a descriptive diagram of an example of a traveling state of a vehicle 1 such as an automobile according to a first embodiment of the disclosure.

FIG. 1 illustrates the vehicle 1, which travels on a single-lane road. The automobile is an example of the vehicle 1. Other examples of the vehicle 1 include buses, trucks, motor cycles, personal mobility devices, and the like. Note that the vehicle 1 may be capable of traveling by autonomous driving including drive assistance.

A preceding vehicle 2 is traveling in front of the lane of the road where the vehicle 1 is traveling. In addition, oncoming vehicles may travel in the oncoming lane of the road. There may also be pedestrians on the road shoulder.

In such a traveling environment, the driver who is driving the vehicle 1 operates the vehicle 1 to travel so as not to deviate from the lane where the vehicle 1 is traveling, while paying attention to the front side, which is the direction of travel of the vehicle 1, for example.

In addition, if the traveling environment is dark at night, the vehicle 1 turns on the headlamps.

By the way, with regard to the vehicle 1, it has been researched to render a road surface image 11 on the road surface of the road.

As a result, the driver of the vehicle 1 can obtain information related to the traveling state and traveling environment of the vehicle 1 from the road surface image 11 rendered on the road surface without greatly moving the driver's line of sight toward the front. For example, in FIG. 1, the road surface image 11 based on a normal light projection pattern 61 indicating a left turn, which will be described later, is rendered on the road surface of the lane where the vehicle 1 is traveling. In this case, the driver of the vehicle 1 can control the traveling so as to recognize and prepare through the road surface that it will soon be necessary to turn left without greatly losing the driver's line of sight toward the front.

However, the road surface image 11 rendered on the road surface by light projection from the vehicle 1 in this way may not necessarily be desirable.

For example, there may be the preceding vehicle 2 on the road on which the vehicle 1 is traveling, as illustrated in FIG. 1. In this case, light Ref reflected from the road surface image 11 toward the preceding vehicle 2 may occur. Such reflected light Ref may, in some cases, impair the rearward visibility from the preceding vehicle 2.

As described above, there is a demand for improved road surface image rendering from the vehicle 1.

Figure 2:
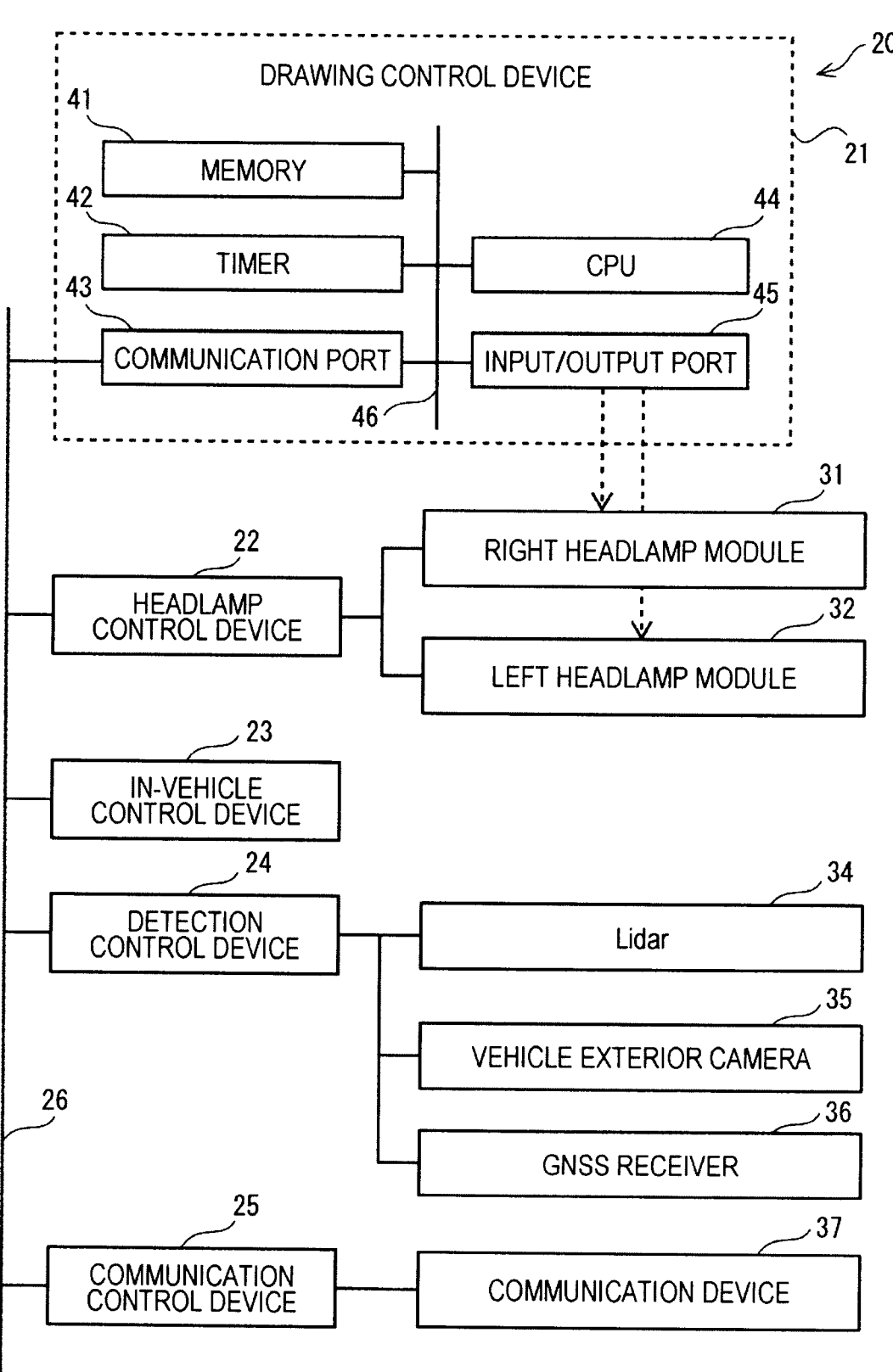
FIG. 2 is a descriptive diagram of a control system provided in the vehicle illustrated in FIG. 1.

FIG. 2 is a descriptive diagram of a control system 20 provided in the vehicle 1 illustrated in FIG. 1.

The control system 20 of the vehicle 1 illustrated in FIG. 2 has control devices and a vehicle network 26 to which the control devices are connected.

The vehicle network 26 may be a wired communication network compliant with, for example, Controller Area Network (CAN) and Local Interconnect Network (LIN) for the vehicle 1. The vehicle network 26 may be a communication network, such as a local area network (LAN), or a combination of the foregoing networks. The vehicle network 26 may partially include a wireless communication network. Various devices described above that are connected to the vehicle network 26 can send and receive information to and from each other through the vehicle network 26.

Moreover, FIG. 2 illustrates examples of the control devices, including a rendering control device 21, a headlamp control device 22, a traveling control device 23, a detection control device 24, and a communication control device 25. Other control devices, including an air conditioning control device, may be connected to the vehicle network 26. Also, each control device illustrated in FIG. 2 may be divided into multiple parts and these multiple parts may be connected to the vehicle network 26.

A right headlamp module 31 and a left headlamp module 32 provided in a front end 50 of the vehicle 1 are connected to the headlamp control device 22. The right headlamp module 31 and the left headlamp module 32 are headlamp members configured to project light onto the front side of the vehicle 1.

Furthermore, the right headlamp module 31 and the left headlamp module 32 of the present embodiment each have a light projection module 53 for road surface image rendering, as will be described later. In the present embodiment, the light projection module 53 of the right headlamp module 31 and the light projection module 53 of the left headlamp module 32 each may serve as a light projection member capable of projecting light for road surface image rendering toward the road surface at least in front of the vehicle 1. That is, the light projection member may include a light source.

The headlamp control device 22 controls the illumination state of the right headlamp module 31 and the illumination state of the left headlamp module 32 in response to information of the operation of a non-illustrated lamp operating lever and information of the detected value of a non-illustrated light intensity sensor for auto-light, obtained through the vehicle network 26. In general, the operating states of low beam lighting, high beam lighting, and off can be set to the lamp operating lever.

The headlamp control device 22 may then output information of the illumination state of the right headlamp module 31 and the left headlamp module 32 to other control devices through the vehicle network 26.

The traveling control device 23 controls the traveling of the vehicle 1. The traveling control device 23 may generate control values for traveling control based on the driver's driving operations or may generate control values for traveling control based on autonomous driving or drive assistance.

In the case of executing cruise control in autonomous driving or drive assistance, the traveling control device 23 may control the vehicle-to-vehicle distance to the preceding vehicle 2 using, for example, a set vehicle-to-vehicle distance for cruise control according to the speed of the vehicle 1. Information of the set vehicle-to-vehicle distance according to the vehicle speed may be recorded in a non-illustrated memory in the traveling control device 23.

Various detection members for detecting the traveling state and the traveling environment of the vehicle 1 are connected to the detection control device 24. FIG. 2 illustrates a Lidar 34, a vehicle exterior camera 35, and a Global Navigation Satellite System (GNSS) receiver 36 as examples of detection members.

The detection control device 24 may then output detection information of the Lidar 34, etc. to other control devices through the vehicle network 26.

The Lidar 34 is provided in the front part of the vehicle 1 and scans the front side, which is the direction of travel of the vehicle 1, with a laser to generate spatial information in front of the vehicle 1. The spatial information generated by the Lidar 34 may include the road surface of the road, the preceding vehicle 2, pedestrians, and the like.

The vehicle exterior camera 35 is provided facing forward in the cabin, which is inside the windshield of the vehicle 1, as illustrated in FIG. 1. The vehicle exterior camera 35 as such can capture images of the front side, which is the direction of travel of the vehicle 1. Note that the vehicle 1 may be provided with multiple vehicle exterior cameras 35. The multiple vehicle exterior cameras 35 may capture images of the surroundings of the vehicle 1 in a divided manner. Furthermore, the vehicle exterior camera 35 may be a 360-degree camera or a stereo camera.

The vehicle exterior camera 35 captures images of the front side, which is the direction of travel of the vehicle 1. In this case, the images captured by the vehicle exterior camera 35 may include the road surface of the road, the preceding vehicle 2, pedestrians, and the like.

As described above, the vehicle exterior camera 35 and the Lidar 34 can serve as a detection device capable of detecting the front side of the vehicle 1, where the road surface image 11 is rendered by the light projection modules 53. That is, the detection device may include a sensor.

Also, the vehicle exterior camera 35 and the Lidar 34 can detect the vehicle-to-vehicle distance to the preceding vehicle 2 in front of the vehicle 1, where the road surface image 11 is rendered by the light projection modules 53.

The GNSS receiver 36 receives radio waves from GNSS satellites to detect the location and time information of the vehicle 1 where the GNSS receiver 36 is provided.

A communication device 37 is connected to the communication control device 25. The communication device 37 sends and receives information to and from a server device through non-illustrated base stations and the like. The base stations may be, for example, base stations for 5G, Advanced Driver Assistance Systems (ADAS), or Intelligent Transport Systems (ITS). There are some base stations for 5G that can implement the functions of a server device. The communication device 37 may also communicate directly with other vehicles 1 and the like through Vehicle to X (V2X) communication.

The communication control device 25 may then send the information, obtained from the vehicle network 26, from the communication device 37 to a base station or a server device, or output the information, received by the communication device 37 from a base station or a server device, to the vehicle network 26.

The rendering control device 21 has a memory 41, a timer 42, a communication port 43, an input/output port 45, a central processing unit (CPU) 44, and an internal bus 46 to which these components are connected. Control devices provided in the control system 20 may basically have the same structure as the rendering control device 21.

The right headlamp module 31 and the left headlamp module 32 are connected to the input/output port 45.

The communication port 43 is connected to the vehicle network 26. The communication port 43 obtains information from the vehicle network 26, and outputs information output by the rendering control device 21 to the vehicle network 26.

The timer 42 measures time or clock time. The clock time of the timer 42 may be calibrated by the clock time of the GNSS receiver 36.

The memory 41 may include, for example, a semiconductor memory, a hard disk drive (HDD), random access memory (RAM), etc. The HDD is non-volatile memory. The RAM is volatile memory. The memory 41 records a program executed by the CPU 44 and various types of information used during execution of the program as data. The memory 41 may record, for example, data of light projection patterns 60 described later.

The CPU 44 reads and executes the program recorded in the memory 41. As a result, the CPU 44 functions as a controller of the rendering control device 21. In the present embodiment, the CPU 44 functions as a controller configured to control light projection for road surface image rendering by a light projection member.

The CPU 44 as the controller controls the operation of the rendering control device 21. The CPU 44 as the controller also outputs signals to the right headlamp module 31 and the left headlamp module 32 through the input/output port 45. As a result, the CPU 44 as the controller controls the light projection modules 53 for road surface image rendering, which are provided in the right headlamp module 31 and the left headlamp module 32. The right headlamp module 31 and the left headlamp module 32 are illuminated with a light projection pattern for road surface image rendering. On the road surface, for example, as illustrated in FIG. 1, the road surface image 11 corresponding to a light projection pattern may be rendered.

Figure 3:
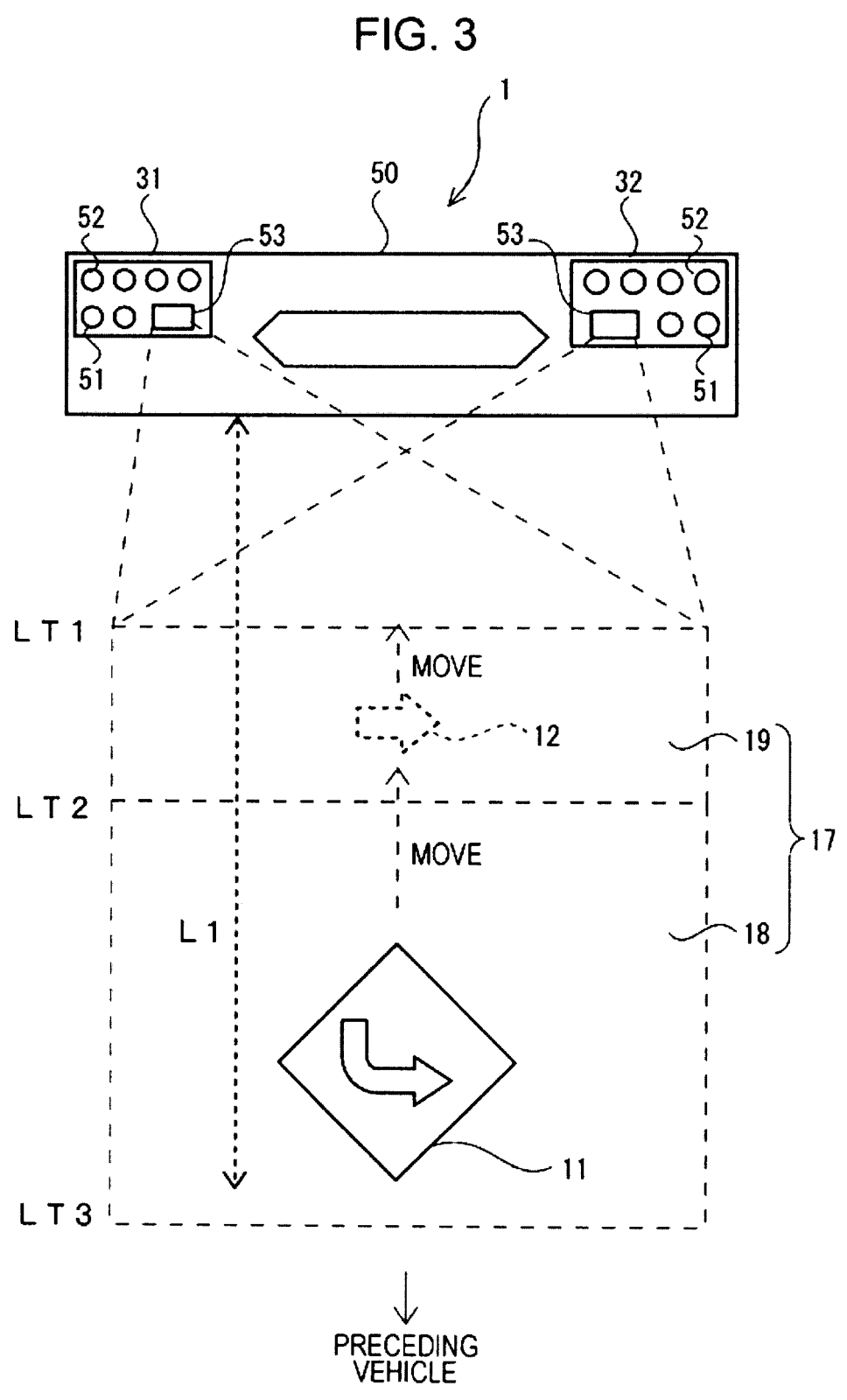

FIG. 3 is a schematic descriptive diagram of the structure and layout of the right headlamp module 31 and the left headlamp module 32 in the front end 50 of the vehicle 1 illustrated in FIG. 1.

In FIG. 3, the front end 50 of the vehicle 1 is illustrated.

At the right end of the front end 50 of the vehicle 1, the right headlamp module 31 is provided. The right headlamp module 31 has light emitting diodes (LEDs) 51 for low beams, LEDs 52 for high beams, and the micro-electromechanical systems (MEMS) light projection module 53.

At the left end of the front end 50 of the vehicle 1, the left headlamp module 32 is provided. The left headlamp module 32 has LEDs 51 for low beams, LEDs 52 for high beams, and the MEMS light projection module 53.

Note that the light projection modules 53 may alternatively be of the digital micromirror device (DMD) format, for example.

Each MEMS light projection module 53 may be, for example, one that projects light from a trichromatic light source by reflecting the light by a MEMS element. The MEMS element may be controlled by an image signal to adjust its reflection state.

The right headlamp module 31 or the left headlamp module 32 may also use something other than the MEMS light projection module 53 for rendering an image on the road surface.

Then, in FIG. 3, the MEMS light projection module 53 of the right headlamp module 31 and the MEMS light projection module 53 of the left headlamp module 32 cooperate to render one large road surface image 11 on the road surface.

Note that the MEMS light projection module 53 of the right headlamp module 31 may project light alone to render the road surface image 11 corresponding to a light projection pattern on the road surface.

Also, the MEMS light projection module 53 of the left headlamp module 32 may project light alone to render the road surface image 11 corresponding to a light projection pattern on the road surface.

By controlling the MEMS light projection module 53 of the right headlamp module 31 and the MEMS light projection module 53 of the left headlamp module 32 according to a light projection pattern, the CPU 44 as the controller can render the road surface image 11 corresponding to the light projection pattern on the road surface.

As described above, the MEMS light projection module 53 of the right headlamp module 31 and the MEMS light projection module 53 of the left headlamp module 32 can each serve as a light projection member capable of projecting light for road surface image rendering toward a road surface in front of the vehicle 1 according to a light projection pattern. In this case, the MEMS light projection module 53 of the right headlamp module 31 is a right light projection member provided on the right side of the vehicle 1. The MEMS light projection module 53 of the left headlamp module 32 is a left light projection member provided on the left side of the vehicle 1.

Figure 4:
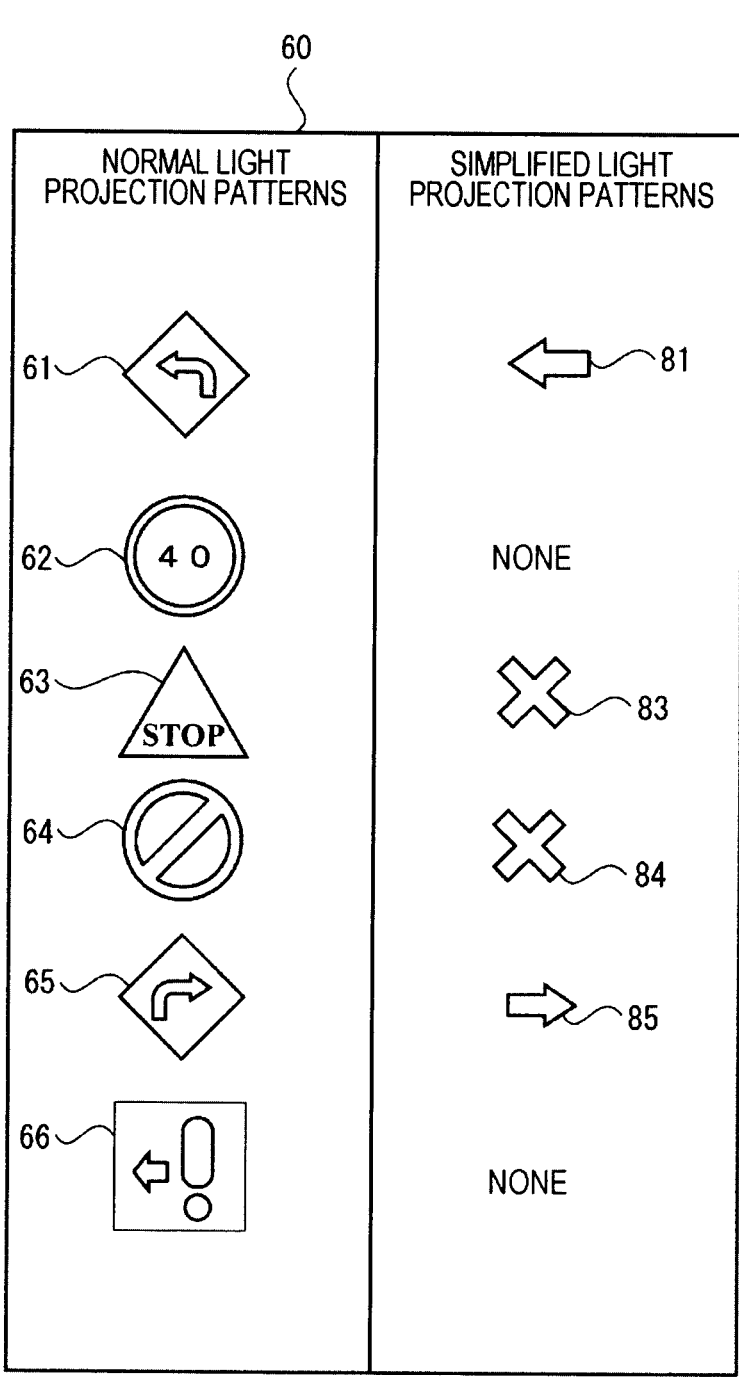
FIG. 4 is a descriptive diagram of an example of a combination of light projection patterns recorded in memory illustrated in FIG. 2.

FIG. 4 is a descriptive diagram of an example of a combination of light projection patterns 60 recorded in the memory 41 illustrated in FIG. 2.

The light projection patterns 60 in FIG. 4 include normal light projection patterns 61 to 66, and simplified light projection patterns 81 to 85 respectively corresponding to the normal light projection patterns. The normal light projection patterns 61 to 66 and the simplified light projection patterns 81 to 85 are light projection patterns that are individually selected and used for the road surface images 11.

The normal light projection patterns 61 to 66 in FIG. 4 are exemplified as follows: the normal light projection pattern 61 indicating a left turn, the normal light projection pattern 62 for speed limit, the normal light projection pattern 63 for indicating the stop position, the normal light projection pattern 64 for indicating no crossing, the normal light projection pattern 65 indicating a right turn, and the normal light projection pattern 66 with a pictogram to alert that there is a pedestrian or a bicycle on the road shoulder.

The simplified light projection patterns 81 to 85 in FIG. 4 are exemplified as follows: the simplified light projection pattern 81 indicating a left turn, the simplified light projection pattern 83 for indicating the stop position, the simplified light projection pattern 84 for indicating no crossing, and the simplified light projection pattern 85 indicating a right turn.

Here, the simplified light projection pattern 81 indicating a left turn is a simplified light projection pattern with a smaller light projection area than the normal light projection pattern 61 indicating a left turn.

The simplified light projection pattern 83 for indicating the stop position is a simplified light projection pattern with a smaller light projection area than the normal light projection pattern 63 for indicating the stop position.

The simplified light projection pattern 84 for indicating no crossing is a simplified light projection pattern with a smaller light projection area than the normal light projection pattern 64 for indicating no crossing.

The simplified light projection pattern 85 indicating a right turn is a simplified light projection pattern with a smaller light projection area than the normal light projection pattern 65 indicating a right turn.

Note that FIG. 4 does not include a simplified light projection pattern for the normal light projection pattern 62 for speed limit and a simplified light projection pattern for the normal light projection pattern 66 with a pictogram to alert that there is a pedestrian or a bicycle on the road shoulder. In this case, no light projection is performed in the case of projecting these simplified light projection patterns. In this case, no road surface image 11 is rendered on the road surface.

Then, the CPU 44 as the controller of the vehicle 1 selects a light projection pattern pertaining to a request from among the light projection patterns 60 based on the traveling state, the vehicle-to-vehicle distance to the preceding vehicle 2, and the like, and renders the road surface image 11 corresponding to the light projection pattern on the road surface.

FIGS. 1 and 3 will now be used to describe an overview of road surface image rendering control in the present embodiment.

As illustrated in FIGS. 1 and 3, the MEMS light projection module 53 of the right headlamp module 31 as the right light projection member provided on the right side of the vehicle 1 and the MEMS light projection module 53 of the left headlamp module 32 as the left light projection member provided on the left side of the vehicle 1 are capable of rendering the road surface image 11 by projecting light onto the road surface in a light projection range 17, corresponding to the width of the lane in which the vehicle 1 is traveling, which is the range from the point at which the distance from the vehicle 1 is a third threshold LT3 to the point at which the distance from the vehicle 1 is a first threshold LT1.

Based on the vehicle 1, the light projection range 17 from the point at which the distance from the vehicle 1 is the third threshold LT3 to the point at which the distance from the vehicle 1 is the first threshold LT1 is divided into a normal light projection range 18 and a proximity light projection range 19 by the boundary at which the distance from the vehicle 1 is a second threshold LT2.

The left and right light projection modules 53 of the present embodiment control light projection to render the road surface image 11 in the normal light projection range 18 under the control of the CPU 44 as the controller in the case where the vehicle-to-vehicle distance to the preceding vehicle 2 is secured. The left and right light projection modules 53 cooperate to execute light projection into the normal light projection range 18 based on a normal light projection pattern selected from among the light projection patterns 60 illustrated in FIG. 4. As a result, the line of sight movement of the driver of the vehicle 1 is suppressed. The driver of the vehicle 1 can see and recognize the road surface image 11 and obtain information provided by the road surface image 11 while maintaining the driver's line of sight toward the front.

However, it is not always possible to ensure a sufficient vehicle-to-vehicle distance between the preceding vehicle 2 and the vehicle 1. Therefore, if the preceding vehicle 2 approaches the vehicle 1, the left and right light projection modules 53 cause the light projection position of the road surface image 11 to approach the vehicle 1 according to the vehicle-to-vehicle distance to the preceding vehicle 2 under the control of the CPU 44 as the controller. In this case, the light projection position of the road surface image 11 may move from the normal light projection range 18 to the proximity light projection range 19.

The left and right light projection modules 53 also execute control for reducing the influence of the reflected light Ref on the preceding vehicle 2 under the control of the CPU 44 as the controller due to the fact that the preceding vehicle 2 is approaching the vehicle 1. In the case of projecting light into the proximity light projection range 19, the left and right light projection modules 53 execute light projection based on a simplified light projection pattern selected from among the light projection patterns 60 illustrated in FIG. 4. A simplified light projection pattern has a smaller light projection area than a normal light projection pattern. In addition, the left and right light projection modules 53 dim when projecting light into the proximity light projection range 19 than when projecting light into the normal light projection range 18. With these types of control, it can be expected that the light Ref reflected from a simplified road surface image 12 to the preceding vehicle 2 due to the projection of light into the proximity light projection range 19 will be reduced. The light Ref reflected to the preceding vehicle 2 which is approaching the vehicle 1 may be suppressed.

Figure 5:
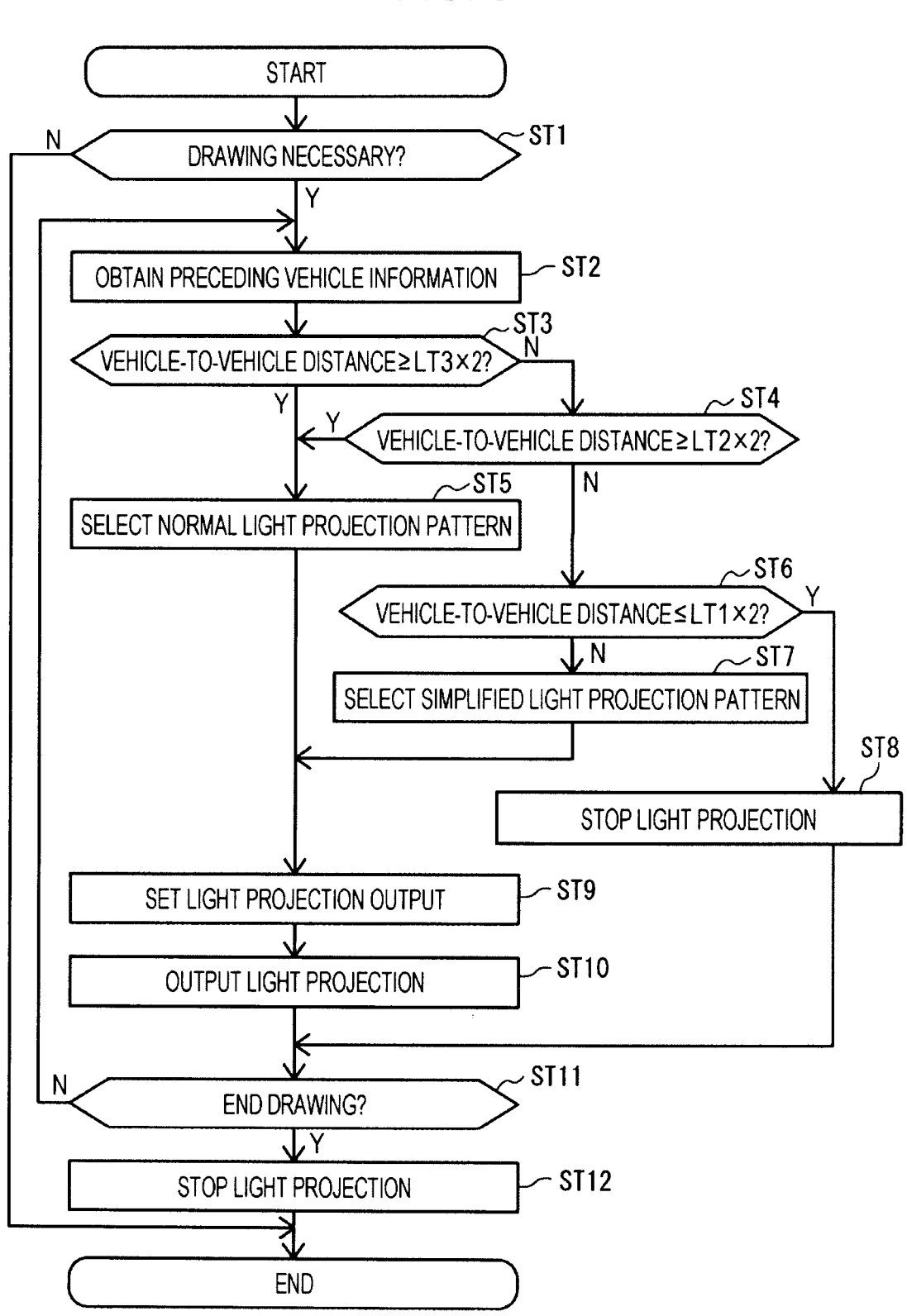
FIG. 5 is a flowchart of road surface image rendering control in the first embodiment, executed by a rendering control device illustrated in FIG. 2.

FIG. 5 is a flowchart of road surface image rendering control in the first embodiment, executed by the rendering control device 21 illustrated in FIG. 2.

The CPU 44, as the controller of the rendering control device 21, repeatedly executes the road surface image rendering control illustrated in FIG. 5.

Note that, in the case where rendering control functionality is implemented in the headlamp control device 22 in the control system 20, the CPU of the headlamp control device 22, as the controller, may repeatedly execute the road surface image rendering control illustrated in FIG. 5.

In step ST1, the CPU 44, which controls light projection for road surface image rendering, determines the necessity of road surface image rendering. A request for road surface image rendering may be generated by various control devices in the control system 20. For example, in the case where the headlamp control device 22 is to cause the headlamps to be illuminated, the headlamp control device 22 may generate information requesting road surface image rendering and output it to the rendering control device 21 through the vehicle network 26. If there is a request for road surface image rendering, the CPU 44 advances the process to step ST2. If there is no request for road surface image rendering, the CPU 44 ends this control.

In step ST2, the CPU 44 obtains preceding vehicle information.

Here, the CPU 44 may obtain the latest image captured by the vehicle exterior camera 35 and the latest spatial information obtained by the Lidar 34, which serve as a detection device, and obtain information of the preceding vehicle 2 by analyzing these pieces of information.

In addition, the CPU 44 may obtain information of the vehicle-to-vehicle distance L1 from the vehicle 1 to the preceding vehicle 2 as information of the preceding vehicle 2.

As a result, the CPU 44 can obtain information of the vehicle-to-vehicle distance L1 to the preceding vehicle 2 in front of the vehicle 1, where the road surface image 11 is rendered by the light projection modules 53.

In step ST3, the CPU 44 determines whether the vehicle-to-vehicle distance L1 from the vehicle 1 to the preceding vehicle 2, which is obtained in step ST2, is greater than or equal to twice the distance of the third threshold LT3. In the case where the vehicle-to-vehicle distance L1 is greater than or equal to twice the distance of the third threshold LT3, the CPU 44 advances the process to step ST5. In contrast, in the case where the vehicle-to-vehicle distance L1 is not greater than or equal to twice the distance of the third threshold LT3, the CPU 44 advances the process to step ST4.

In step ST4, the CPU 44 determines whether the vehicle-to-vehicle distance L1 from the vehicle 1 to the preceding vehicle 2, which is obtained in step ST2, is greater than or equal to twice the distance of the second threshold LT2. In the case where the vehicle-to-vehicle distance L1 is greater than or equal to twice the distance of the second threshold LT2, the CPU 44 advances the process to step ST5. In contrast, in the case where the vehicle-to-vehicle distance L1 is not greater than or equal to twice the distance of the second threshold LT2, the CPU 44 advances the process to step ST6.

In step ST5, the CPU 44 selects a normal light projection pattern pertaining to the request from among the light projection patterns 60 recorded in the memory 41. The CPU 44 then advances the process to step ST9 to render the road surface image 11 onto the road surface by projecting light based on the selected normal light projection pattern.

In step ST6, the CPU 44 determines whether the vehicle-to-vehicle distance L1 from the vehicle 1 to the preceding vehicle 2, which is obtained in step ST2, is less than or equal to twice the distance of the first threshold LT1. In the case where the vehicle-to-vehicle distance L1 is less than or equal to twice the distance of the first threshold LT1, the CPU 44 advances the process to step ST8. In contrast, in the case where the vehicle-to-vehicle distance L1 is not less than or equal to twice the distance of the first threshold LT1, the CPU 44 advances the process to step ST7.

In step ST7, the CPU 44 selects a simplified light projection pattern pertaining to the request from among the light projection patterns 60 recorded in the memory 41. The CPU 44 then advances the process to step ST9 to render the simplified road surface image 12 onto the road surface by projecting light based on the selected simplified light projection pattern.

Note that, in step ST5, the normal light projection pattern is selected. That is, when the vehicle-to-vehicle distance L1 becomes less than twice the second threshold LT2 which is greater than the first threshold LT1, the CPU 44 will change the light projection pattern for road surface image rendering on the road surface from a normal one to a simplified one with a reduced light amount.

In step ST8, the CPU 44 stops the light projection by the light projection modules 53 to stop the rendering of the road surface image 11.

As a result, when the detected vehicle-to-vehicle distance L1 becomes less than or equal to twice the first threshold LT1, the CPU 44 can stop projecting light by the light projection modules 53 to stop the rendering of the road surface image 11.

The CPU 44 then advances the process to step ST11.

In step ST9, the CPU 44 performs a setup process for light projection output. The details of the setup process for light projection output are described using FIG. 6.

For example, the CPU 44 may change the position of the road surface image 11 rendered on the road surface by the light projection modules 53 based on a vehicle-to-vehicle setting distance for cruise control of the traveling control device 23 of the vehicle 1.

In step ST10, the CPU 44 starts projecting light from the light projection modules 53. The CPU 44 causes the light projection modules 53 to project light according to the selected light projection pattern under the light projection output settings in step ST9. As a result, the road surface image 11 or the simplified road surface image 12 is rendered at a position corresponding to the light projection output settings and with a size corresponding to the light projection output settings.

In step ST11, the CPU 44 determines whether to end the road surface image rendering. The CPU 44 may determine to end the road surface image rendering, for example, if there is no request for road surface image rendering. In this case, the CPU 44 advances the process to step ST12.

For example, if a request for road surface image rendering remains, the CPU 44 determines not to end the road surface image rendering and returns the process to step ST2. In this case, the CPU 44 repeats the process from step ST2 to step ST11 to continue control for road surface image rendering.

In step ST12, the CPU 44 controls the light projection modules 53 to stop light projection for the road surface image 11 or the simplified road surface image 12 from the light projection modules 53. As a result, the road surface image 11 or the simplified road surface image 12 will no longer be rendered on the road surface of the road.

The CPU 44 then ends this control.

In this way, the CPU 44 as the controller can render the road surface image 11 on the road surface at a position according to the detected vehicle-to-vehicle distance L1 to the preceding vehicle 2.

However, if the vehicle-to-vehicle distance L1 is less than or equal to twice the first threshold LT1, the CPU 44 stops rendering the road surface image 11.

Figure 6:
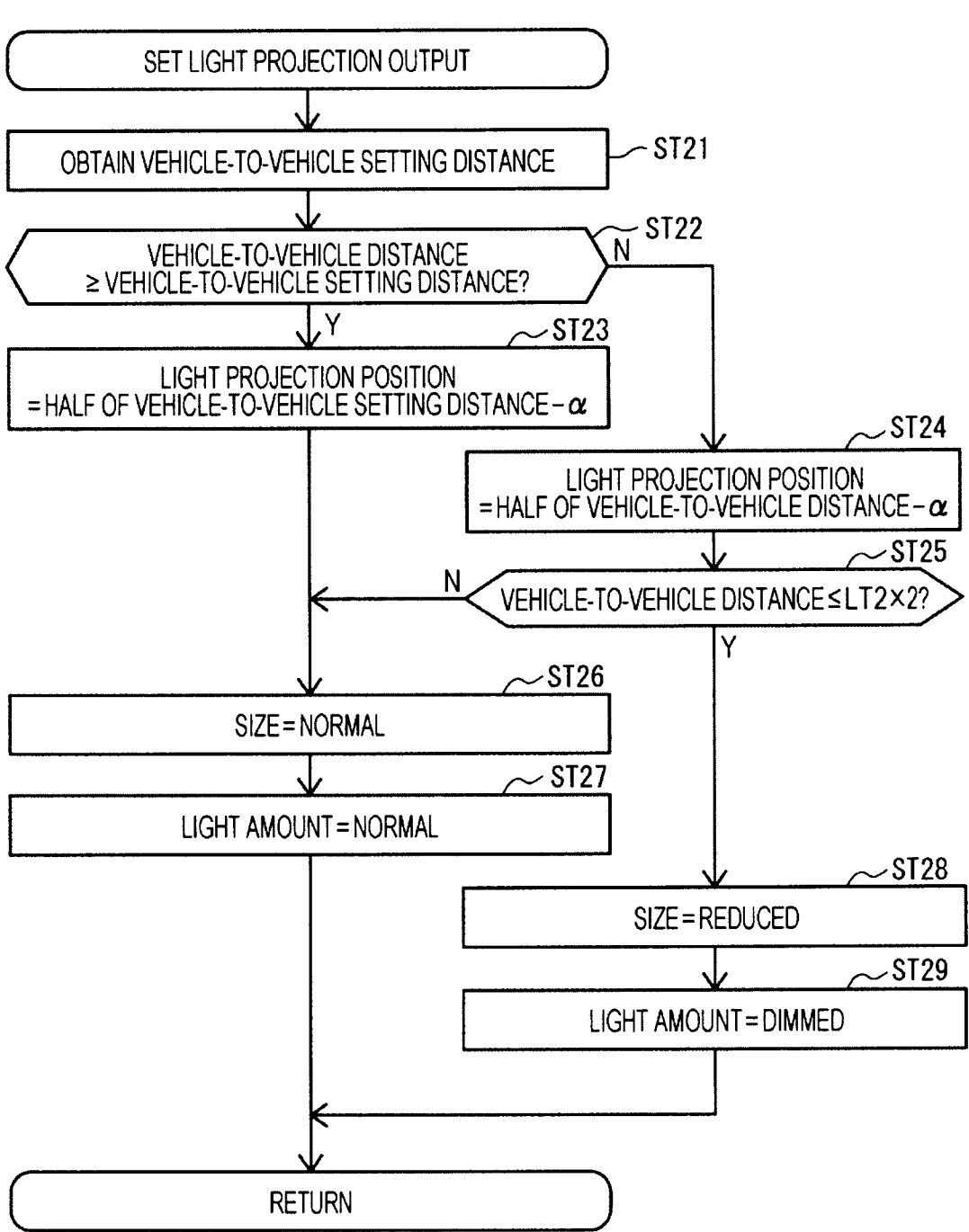
FIG. 6 is a flowchart of detailed control for setting light projection output in step ST9 of FIG. 5.

FIG. 6 is a flowchart of detailed control for setting light projection output in step ST9 of FIG. 5.

The CPU 44 as the controller of the rendering control device 21 executes the road surface image rendering control of FIG. 6 in the light projection output setup process in step ST9.

In step ST21, the CPU 44 obtains the vehicle-to-vehicle setting distance for cruise control of the traveling control device 23 of the vehicle 1. The vehicle-to-vehicle setting distance for cruise control basically varies depending on the speed of the vehicle 1. Note that, even if the vehicle-to-vehicle setting distance is short, the vehicle-to-vehicle setting distance is often basically set to greater than or equal to twice the distance of the third threshold LT3. In congested traffic where the vehicle-to-vehicle setting distance becomes less than twice the distance of the third threshold LT3, the traveling control device 23 suspends traveling control by cruise control in many cases.

In step ST22, the CPU 44 determines whether the detected vehicle-to-vehicle distance L1 is greater than or equal to the vehicle-to-vehicle setting distance for cruise control.

In the case where the vehicle-to-vehicle distance L1 is greater than or equal to the vehicle-to-vehicle setting distance for cruise control, the CPU 44 advances the process to step ST23.

In contrast, in the case where the vehicle-to-vehicle distance L1 is not greater than or equal to the vehicle-to-vehicle setting distance for cruise control, the CPU 44 advances the process to step ST24.

In step ST23, the CPU 44 sets the light projection position of the road surface image 11 slightly closer to the vehicle 1 than half of the vehicle-to-vehicle setting distance for cruise control. Here, is used to bring the distance closer.

In this way, the CPU 44 can change the position of the road surface image 11 rendered on the road surface by the light projection modules 53 based on the vehicle-to-vehicle setting distance for cruise control of the vehicle 1.

In this way, the CPU 44 can change the position of the road surface image 11 rendered on the road surface by the light projection modules 53 so that the distance from the vehicle 1 to the road surface image 11 will be less than or equal to half of the vehicle-to-vehicle setting distance for cruise control.

The CPU 44 then advances the process to step ST26.

In step ST24, the CPU 44 sets the light projection position of the road surface image 11 slightly closer to the vehicle 1 than half of the detected vehicle-to-vehicle distance L1. Here, is used to bring the distance closer.

In this way, the CPU 44 can change the position of the road surface image 11 rendered on the road surface by the light projection modules 53 so that the distance from the vehicle 1 to the road surface image 11 will be less than or equal to half of the detected vehicle-to-vehicle distance L1.

In step ST25, the CPU 44 determines whether the detected vehicle-to-vehicle distance L1 is less than or equal to twice the distance of the second threshold LT2. In the case where the vehicle-to-vehicle distance L1 is less than or equal to twice the distance of the second threshold LT2, the CPU 44 advances the process to step ST28. In contrast, in the case where the vehicle-to-vehicle distance L1 is not less than or equal to twice the distance of the second threshold LT2, the CPU 44 advances the process to step ST26.

In step ST26, since the road surface image 11 will be projected into the normal light projection range 18, the CPU 44 selects the normal size as the size of the road surface image 11 based on the light projection pattern.

In step ST27, since the road surface image 11 will be projected into the normal light projection range 18, the CPU 44 selects the normal light amount as the amount of light projected for the road surface image 11 based on the light projection pattern. The CPU 44 then ends control of FIG. 6 and advances the process to step ST10 of FIG. 5.

In step ST28, since the simplified road surface image 12 will be projected into the proximity light projection range 19, the CPU 44 selects a reduced size in comparison to the normal size as the size of the simplified road surface image 12 based on the light projection pattern.

In step ST29, since the simplified road surface image 12 will be projected into the proximity light projection range 19, the CPU 44 selects the dimmed light amount in comparison to the normal light amount as the amount of light projected for the simplified road surface image 12 based on the light projection pattern. The CPU 44 then ends control of FIG. 6 and advances the process to step ST10 of FIG. 5.

In this way, the CPU 44 can change the position of the road surface image 11 or the simplified road surface image 12 rendered on the road surface by the light projection modules 53 in accordance with the detected vehicle-to-vehicle distance L1 and render the road surface image 11 or the simplified road surface image 12 on the road surface closer to the vehicle 1 than the rear end of the preceding vehicle 2.

Next, various states in which light projection is controlled will be described using an image 70 captured by the vehicle exterior camera 35 illustrated in FIG. 2.

The driver of the vehicle 1 can see ahead as in the image 70 captured by the vehicle exterior camera 35.

Figure 7:
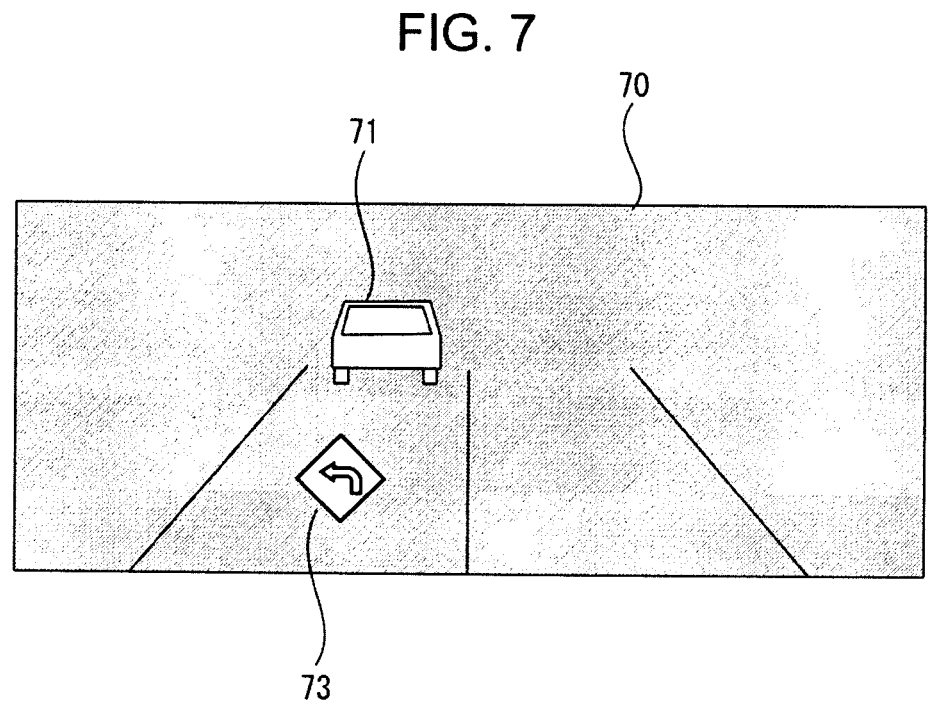
FIG. 7 is a descriptive diagram of an image captured by a vehicle exterior camera illustrated in FIG. 2 in a state where a vehicle-to-vehicle distance to a preceding vehicle is greater than or equal to twice a second threshold, and a road surface image based on a normal light projection pattern is light-projected on a road surface.

FIG. 7 is a descriptive diagram of the image 70 captured by the vehicle exterior camera 35 illustrated in FIG. 2 in a state where the vehicle-to-vehicle distance L1 to the preceding vehicle 2 is greater than or equal to twice the second threshold LT2, and the road surface image 11 based on a normal light projection pattern is light-projected onto the road surface.

In this case, the image 70 captured by the vehicle exterior camera 35 includes an image 73 of the road surface image 11 based on a normal light projection pattern, along with an image 71 of the preceding vehicle 2.

The driver of the vehicle 1 can easily see and recognize the road surface image 11 based on the normal light projection pattern rendered on the road surface while looking in the direction of the preceding vehicle 2.

Moreover, the position of the road surface image 11 here is a position slightly closer to the vehicle 1 than at least half of the vehicle-to-vehicle distance L1 to the preceding vehicle 2, as a result of the processing of step ST23 or step ST24 in FIG. 6.

As a result, it is considered that it will be difficult for the light Ref reflected from the road surface image 11 to reach the preceding vehicle 2. It is thus difficult to impair the rearward visibility of the preceding vehicle 2.

Figure 8:
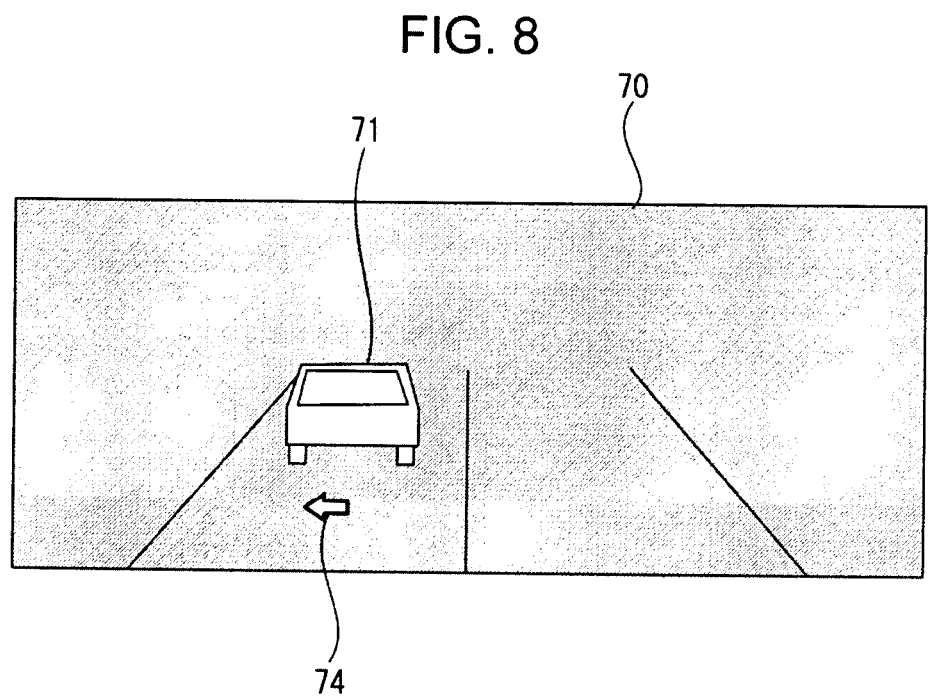
FIG. 8 is a descriptive diagram of an image captured by the vehicle exterior camera illustrated in FIG. 2 in a state where the vehicle-to-vehicle distance to the preceding vehicle is less than twice the second threshold, and a road surface image based on a simplified light projection pattern is light-projected on the road surface.

FIG. 8 is a descriptive diagram of the image 70 captured by the vehicle exterior camera 35 illustrated in FIG. 2 in a state where the vehicle-to-vehicle distance L1 to the preceding vehicle 2 is less than twice the second threshold LT2, and the simplified road surface image 12 based on a simplified light projection pattern is light-projected onto the road surface.

In this case, the image 70 captured by the vehicle exterior camera 35 includes, along with the image 71 of the preceding vehicle 2, an image 74 of the simplified road surface image 12 based on the simplified light projection pattern.

The driver of the vehicle 1 can relatively easily see and recognize the simplified road surface image 12 based on the simplified light projection pattern rendered on the road surface while looking in the direction of the preceding vehicle 2.

Moreover, the position of the simplified road surface image 12 here is a position slightly closer to the vehicle 1 than half of the vehicle-to-vehicle distance L1 to the preceding vehicle 2, as a result of the processing of step ST24 in FIG. 6.

In addition, the simplified road surface image 12 based on the simplified light projection pattern has a smaller area of projection light and a reduced amount of projection light in comparison to the road surface image 11 based on the normal light projection pattern.

As a result, although the preceding vehicle 2 is closer to the vehicle 1 than in the case illustrated in FIG. 7, it is considered that it will be difficult for the light Ref reflected from the simplified road surface image 12 to reach the preceding vehicle 2. It is thus difficult to impair the rearward visibility of the preceding vehicle 2.

Figure 9:
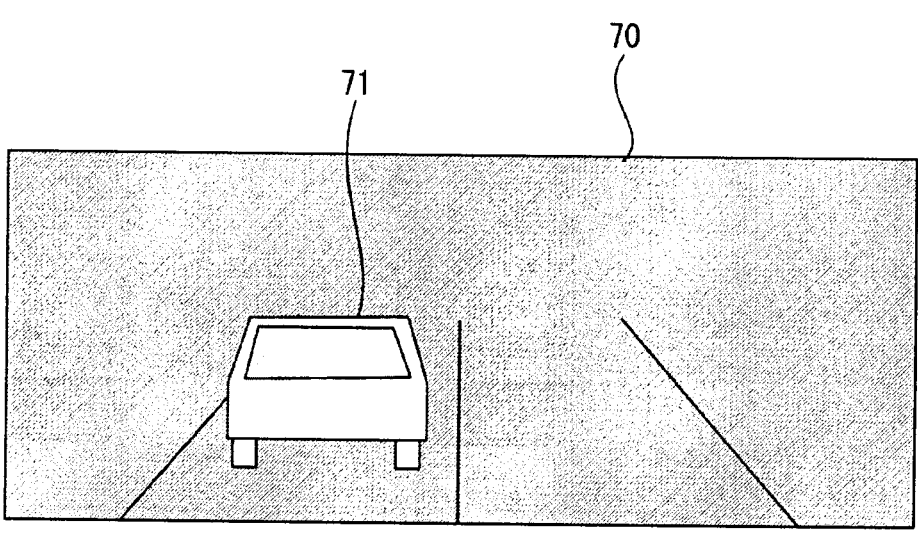
FIG. 9 is a descriptive diagram of an image captured by the vehicle exterior camera illustrated in FIG. 2 in a state where the vehicle-to-vehicle distance to the preceding vehicle is less than or equal to twice a first threshold, and road surface image rendering is stopped.

FIG. 9 is a descriptive diagram of the image 70 captured by the vehicle exterior camera 35 illustrated in FIG. 2 in a state where the vehicle-to-vehicle distance L1 to the preceding vehicle 2 is less than or equal to twice the first threshold LT1, and road surface image rendering is stopped.

In this case, the image 70 captured by the vehicle exterior camera 35 includes the image 71 of the preceding vehicle 2 alone, and does not include the images of the road surface images 11 and 12 based on light projection patterns.

As a result, although the preceding vehicle 2 is closer to the vehicle 1 than in the case illustrated in FIG. 8, there will be no light Ref reflected from the road surface images 11 and 12. It is thus difficult to impair the rearward visibility of the preceding vehicle 2.

As described above, the vehicle 1 of the present embodiment has a detection device capable of detecting the vehicle-to-vehicle distance L1 to the preceding vehicle 2, which is in front of the vehicle 1, where a road surface image is rendered by the light projection modules 53. Then, the CPU 44, as a controller configured to control light projection for road surface image rendering by the light projection modules 53, is able to change the position of the road surface image 11 or 12 rendered on the road surface by the light projection modules 53 in accordance with the detected vehicle-to-vehicle distance L1 and to render the road surface image 11 or 12 on the road surface closer to the vehicle 1 than the rear end of the preceding vehicle 2.

As a result, it can be expected that the road surface image 11 or 12 will have difficulty impairing the rearward visibility of the preceding vehicle 2 due to its reflected light Ref.

As described above, it can be expected in the present embodiment that light projection for road surface image rendering will be controlled to improve road surface image rendering from the vehicle 1.

Second Embodiment

Next, a road surface image rendering device of the vehicle 1 according to a second embodiment of the disclosure will be described.

In the present embodiment, light projection for road surface image rendering by the light projection modules 53 is executed with light projection output settings different from the above-described embodiment.

Hereinafter, differences from the above-described embodiment will be described mainly.

FIG. 10 is a flowchart of detailed control for setting light projection output in the second embodiment, executed in step ST9 of FIG. 5 by the rendering control device 21 illustrated in FIG. 2.

The CPU 44 as a controller of the rendering control device 21 executes road surface image rendering control illustrated in FIG. 10 in road surface image rendering control illustrated in FIG. 5.

Note that, in the case where rendering control functionality is implemented in the headlamp control device 22 in the control system 20, the CPU of the headlamp control device 22 may repeatedly execute the road surface image rendering control illustrated in FIG. 10 in the road surface image rendering control illustrated in FIG. 5.

Steps ST21 through ST29 are the same as those in the above-described embodiment.

However, after the processing of step ST29 in the case of projecting the simplified road surface image 12 into the proximity light projection range 19, the CPU 44 advances the process to step ST31.

In step ST31, the CPU 44 sets the light projection lateral position of the simplified road surface image 12 in the proximity light projection range 19. The vertical position of the simplified road surface image 12 has already been set in step ST24.

If no particular setting is done for the light projection lateral position, the light projection lateral position of the simplified road surface image 12 is basically the widthwise center of the lane in which the vehicle 1 is traveling, as illustrated in FIG. 1 or FIG. 3. Accordingly, in the case where the processing of step ST31 is not executed, the light projection lateral position of the simplified road surface image 12 in the proximity light projection range 19 is set to the widthwise center of the lane in which the vehicle 1 is traveling.

Then, the CPU 44 sets the light projection lateral position of the simplified road surface image 12 in the proximity light projection range 19 to be positioned toward the widthwise end of the lane in which the vehicle 1 is traveling.

At this time, in the case where there is an adjacent lane on the right side of the lane in which the vehicle 1 is traveling as illustrated in FIG. 1, the CPU 44 may set the light projection lateral position of the simplified road surface image 12 to be positioned toward the end on the left road shoulder side where there is no adjacent lane. That is, in the case where there is an adjacent lane on just one side in the width direction of the lane in which the vehicle 1 is traveling, the CPU 44 may set the light projection lateral position of the simplified road surface image 12 to be positioned toward the end on the side opposite to the adjacent lane.

Note that, in the case where there are adjacent lanes on both sides of the width direction of the lane in which the vehicle 1 is traveling, the CPU 44 is unable to set the light projection lateral position of the simplified road surface image 12 to be positioned toward the end on the side where there is no adjacent lane. In this case, the CPU 44 may stop the light projection by the light projection modules 53 and stop the rendering of the simplified road surface image 12 in the proximity light projection range 19.

In step ST32, the CPU 44 selects one of the left and right light projection modules 53 as the light projection module 53 used for projecting light into the proximity light projection range 19. The left and right light projection modules 53 are a right light projection member and a left light projection member.

At this time, the CPU 44 selects the light projection module 53 located on the side opposite to the widthwise end set to position the simplified road surface image 12. For example, in the case where there is an adjacent lane on just one side in the width direction of the lane in which the vehicle 1 is traveling, the CPU 44 selects the light projection module 53 on this adjacent lane side.

Then, by selecting the light projection module 53 on the side opposite to the side set to position the simplified road surface image 12 as the light projection member to be used for the simplified road surface image 12, the CPU 44, in the light projection output of step ST10 in FIG. 5, executes light projection for the simplified road surface image 12 just from the selected light projection module 53.

Figure 11:
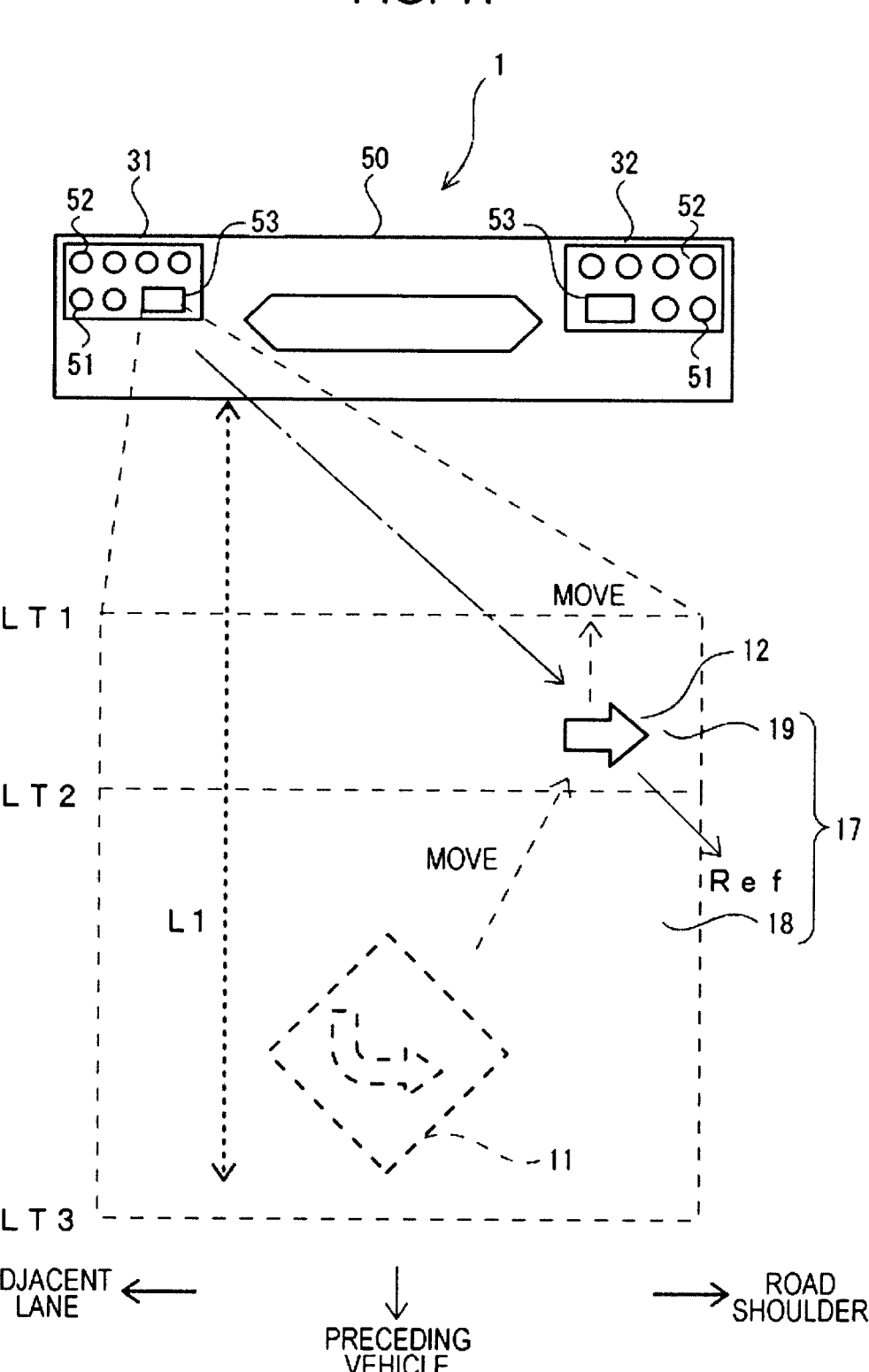
FIG. 11 is a descriptive diagram of a light projection change for road surface image rendering by the right headlamp module and the left headlamp module.

FIG. 11 is a descriptive diagram of a light projection change for the road surface images 11 and 12 by the right headlamp module 31 and the left headlamp module 32.

FIG. 11 corresponds to FIG. 3.

The normal road surface image 11 is then rendered in the normal light projection range 18 at the widthwise center of the lane in which the vehicle 1 is traveling.

In contrast, the simplified road surface image 12 is rendered in the proximity light projection range 19 toward the road shoulder side in the width direction of the lane in which the vehicle 1 is traveling.

In the case where the vehicle-to-vehicle distance to the preceding vehicle 2 is gradually shortened, the road surface image 11 in the normal light projection range 18 will move to approach the vehicle 1 at the widthwise center of the lane in which the vehicle 1 is traveling, and then the road surface image 12 in the proximity light projection range 19 will move to approach the vehicle 1 at a position close to the road shoulder side in the width direction of the lane in which the vehicle 1 is traveling.

In addition, the simplified road surface image 12 in the proximity light projection range 19 is rendered at a position close to the road shoulder side in the width direction of the lane in which the vehicle 1 is traveling by being light-projected just from the right-side light projection module 53 of the right headlamp module 31, which is on the opposite side of the lane in which the vehicle 1 is traveling.

In this way, in the present embodiment, the simplified road surface image 12 rendered toward the widthwise end of the lane in which the vehicle 1 is traveling is projected just from the light projection member opposite to the simplified road surface image 12, out of the left and right light projection modules 53. This projection light is diagonal with respect to the extension direction of the lane in which the vehicle 1 is traveling.

As a result, even if the preceding vehicle 2, which is in front of the vehicle 1 in the lane in which the vehicle 1 is traveling, is close to the vehicle 1, it becomes difficult for the light Ref reflected from the simplified road surface image 12 to reach the preceding vehicle 2. It is also difficult for the light Ref reflected from the simplified road surface image 12 to reach the adjacent lane.

Figure 12:
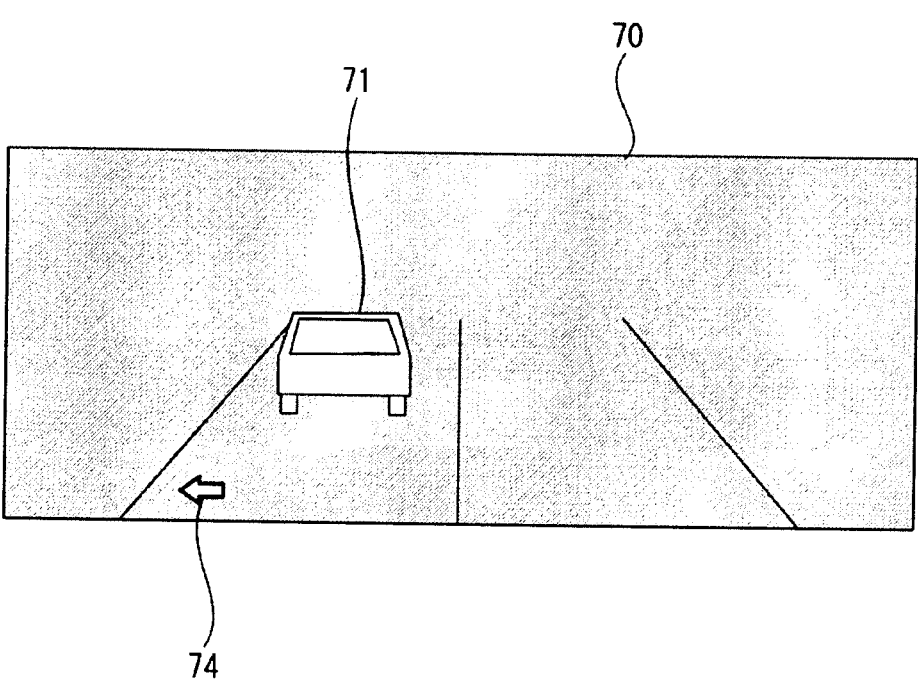
FIG. 12 is a descriptive diagram of an image captured by the vehicle exterior camera illustrated in FIG. 2 in a state where the vehicle-to-vehicle distance to the preceding vehicle is less than twice the second threshold, and a road surface image based on a simplified light projection pattern is light-projected on the road surface in the second embodiment.

FIG. 12 is a descriptive diagram of the image 70 captured by the vehicle exterior camera 35 illustrated in FIG. 2 in a state where the vehicle-to-vehicle distance L1 to the preceding vehicle 2 is less than twice the second threshold LT2, and the simplified road surface image 12 based on the simplified light projection pattern is light-projected onto the road surface in the second embodiment.

FIG. 12 is a diagram that replaces FIG. 8 in the above-described embodiment.

In this case, the image 74 of the simplified road surface image 12 based on the simplified light projection pattern is rendered at a position close to the road shoulder side of the lane in which the vehicle 1 is traveling, in comparison to FIG. 8.

While the above embodiments are examples of embodiments suitable for the disclosure, the disclosure is not limited thereto, and various modifications or changes can be made without departing from the spirit of the disclosure.

In the above-described embodiments, each light projection module 53 as the light projection member is provided in the right headlamp module 31 or the left headlamp module 32 in the vehicle 1, integrated with the LEDs 51 or 52 for the headlamps.

Alternatively, for example, each light projection module 53 as the light projection member may be provided as a separate body from the right headlamp module 31 or the left headlamp module 32 in the vehicle 1.

Moreover, one light projection module 53 may be provided in the vehicle 1, or three or more light projection modules 53 may be provided in the vehicle 1. One light projection module 53 or a third light projection module 53 may be provided in the widthwise center on the front of the vehicle.

A vehicle of the disclosure includes a detection device capable of detecting a vehicle-to-vehicle distance to a preceding vehicle in front of the vehicle, where a road surface image is rendered by a light projection member. Then, a controller configured to control light projection for road surface image rendering by the light projection member changes a position of a road surface image rendered on the road surface by the light projection member in accordance with the vehicle-to-vehicle distance detected by the detection device and renders the road surface image on the road surface closer to the vehicle than a rear end of the preceding vehicle.

As a result, it can be expected that the road surface image will be less likely to impair the rearward visibility of the preceding vehicle due to its reflected light.

As described above, it can be expected in the disclosure that light projection for road surface image rendering will be controlled to improve road surface image rendering from the vehicle.

The CPU 44 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the CPU 44. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle with a road surface image rendering functionality, the vehicle comprising:

a light projection member including a light source, the light projection member being configured to perform light projection for road surface image rendering toward a road surface in front of the vehicle and render a road surface image on the road surface;

a controller comprising a processor and memory storing executable instructions, when executed by the processor, causing the processor to be configured to control the light projection for the road surface image rendering by the light projection member; and a vehicle surrounding sensor configured to detect a vehicle-to-vehicle distance to a preceding vehicle in front of the vehicle, wherein the controller is configured to in accordance with the vehicle-to-vehicle distance detected by the vehicle surrounding sensor, change a position of the road surface image rendered on the road surface by the light projection member so that the position of the road surface image on the road surface is closer to the vehicle than a rear end of the preceding vehicle, and wherein the controller is configured to change the position of the road surface image rendered on the road surface by the light projection member so that a distance from the vehicle to the road surface image is less than or equal to half of the vehicle-to-vehicle distance detected by the vehicle surrounding sensor.

2. The vehicle with the road surface image rendering functionality according to claim 1, wherein the controller is configured to stop the light projection by the light projection member to stop rendering the road surface image when the vehicle-to-vehicle distance detected by the vehicle surrounding sensor becomes less than or equal to twice a first threshold.

3. The vehicle with the road surface image rendering functionality according to claim 2, wherein the controller is configured to control the light projection by the light projection member to change the road surface image rendered on the road surface by the light projection member from a normal image to a simplified image with a reduced amount of light when the vehicle-to-vehicle distance detected by the vehicle surrounding sensor becomes less than twice a second threshold greater than the first threshold.

4. The vehicle with the road surface image rendering functionality according to claim 3, wherein the controller is configured to change the position of the road surface image rendered on the road surface by the light projection member based on a vehicle-to-vehicle setting distance for cruise control of the vehicle.

5. The vehicle with the road surface image rendering functionality according to claim 4, wherein the controller is configured to change the position of the simplified road surface image, which is light-projected from the light projection member when the vehicle-to-vehicle distance becomes less than or equal to twice the second threshold, toward a widthwise end of a lane in which the vehicle is traveling.

6. The vehicle with the road surface image rendering functionality according to claim 5, wherein the light projection member comprises a right light projection member provided in a right side of the vehicle and a left light projection member provided in a left side of the vehicle, wherein the controller is configured to cause one of the right light projection member and the left light projection member to diagonally project the simplified road surface image rendered toward the widthwise end of the lane in which the vehicle is traveling the one of the right light projection member and the left light projection member being on an opposite side to the simplified road surface image.

7. A vehicle with a road surface image rendering functionality, the vehicle comprising:

a light projection member including a light source, the light projection member being configured to perform light projection for road surface image rendering toward a road surface in front of the vehicle and render a road surface image on the road surface;

a controller comprising a processor and memory storing executable instructions, when executed by the processor, causing the processor to be configured to control the light projection for the road surface image rendering by the light projection member; and a vehicle surrounding sensor configured to detect a vehicle-to-vehicle distance to a preceding vehicle in front of the vehicle, wherein the controller is configured to in accordance with the vehicle-to-vehicle distance detected by the vehicle surrounding sensor, change a position of the road surface image rendered on the road surface by the light projection member so that the position of the road surface image on the road surface is closer to the vehicle than a rear end of the preceding vehicle, and wherein the controller is configured to stop the light projection by the light projection member to stop rendering the road surface image when the vehicle-to-vehicle distance detected by the vehicle surrounding sensor becomes less than or equal to twice a first threshold.

8. The vehicle with the road surface image rendering functionality according to claim 7, wherein the controller is configured to control the light projection by the light projection member to change the road surface image rendered on the road surface by the light projection member from a normal image to a simplified image with a reduced amount of light when the vehicle-to-vehicle distance detected by the vehicle surrounding sensor becomes less than twice a second threshold greater than the first threshold.

9. The vehicle with the road surface image rendering functionality according to claim 8, wherein the controller is configured to change the position of the road surface image rendered on the road surface by the light projection member based on a vehicle-to-vehicle setting distance for cruise control of the vehicle.

10. The vehicle with the road surface image rendering functionality according to claim 9, wherein the controller is configured to change the position of the simplified road surface image, which is light-projected from the light projection member when the vehicle-to-vehicle distance becomes less than or equal to to twice the second threshold, toward a widthwise end of a lane in which the vehicle is traveling.

11. The vehicle with the road surface image rendering functionality according to claim 10, wherein the light projection member comprises a right light projection member provided in a right side of the vehicle and a left light projection member provided in a left side of the vehicle, wherein the controller is configured to cause one of the right light projection member and the left light projection member to diagonally project the simplified road surface image rendered toward the widthwise end of the lane in which the vehicle is traveling the one of the right light projection member and the left light projection member being on an opposite side to the simplified road surface image.

12. A vehicle with road surface image rendering functionality, the vehicle comprising:

a light projection member including a light source and configured to perform light projection for road surface image rendering toward a road surface in front of the vehicle and render a road surface image on the road surface;

circuitry configured to control the light projection for the road surface image rendering by the light projection member; and a detection device including a sensor and configured to detect a vehicle-to-vehicle distance to a preceding vehicle in front of the vehicle, wherein the circuitry is configured to in accordance with the vehicle-to-vehicle distance detected by the detection device, change a position of the road surface image rendered on the road surface by the light projection member so that the position of the road surface image on the road surface is closer to the vehicle than a rear end of the preceding vehicle, and wherein the circuitry is configured to change the position of the road surface image rendered on the road surface by the light projection member so that a distance from the vehicle to the road surface image is less than or equal to half of the vehicle-to-vehicle distance detected by the detection device.

* * * * *